Jan. 1, 1935.  H. A. DALLWIGK, JR  1,986,325

PULLEY CONNECTION

Filed April 18, 1929

INVENTOR
HARRY ALLEN DALLWIGK JR.

BY  Richey & Watts

His ATTORNEYS

Patented Jan. 1, 1935

1,986,325

UNITED STATES PATENT OFFICE 1,986,325

PULLEY CONNECTION

Harry Allen Dallwigk, Jr., Brooklyn Station, Ohio

Application April 18, 1929, Serial No. 356,129

2 Claims. (Cl. 74—216.5)

My invention relates to improvements in pulleys and relates more particularly to an improved combination of a pulley and coupling adapted to be used in rope drives or the like wherein the pulley is disposed on a shaft bossed at its ends.

An object of my invention is to provide a pulley wherein the belt or rope used to drive the same may be quickly and readily changed without the necessity of unlacing or splicing the same.

Another object of my invention is to provide a pulley adapted to be mounted upon a pair of axially aligned spaced shafts in such a manner that an endless belt may be quickly and readily disposed about the pulley and/or the shaft without interrupting the continuity of the belt or removing the shaft from its supporting bearings.

These and still other objects and the invention itself will become more apparent from the following description of an embodiment of my invention in which description references will be made to the accompanying drawing forming a part of this specification:

Referring to the drawing.

Figure 1:
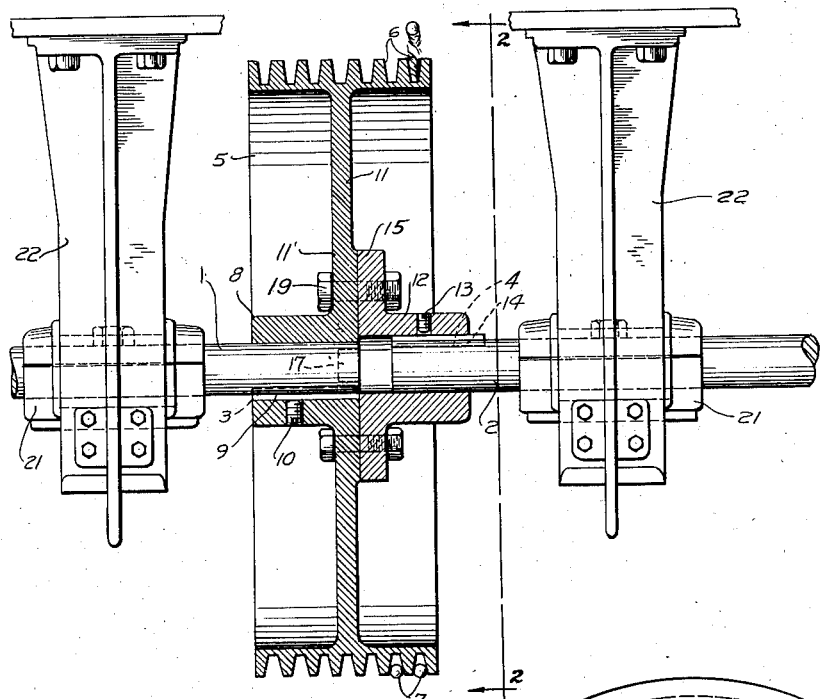
Fig. 1 is a vertical, medial sectional view of the pulley and coupling of my invention mounted upon a pair of shafts.
Figure 2:
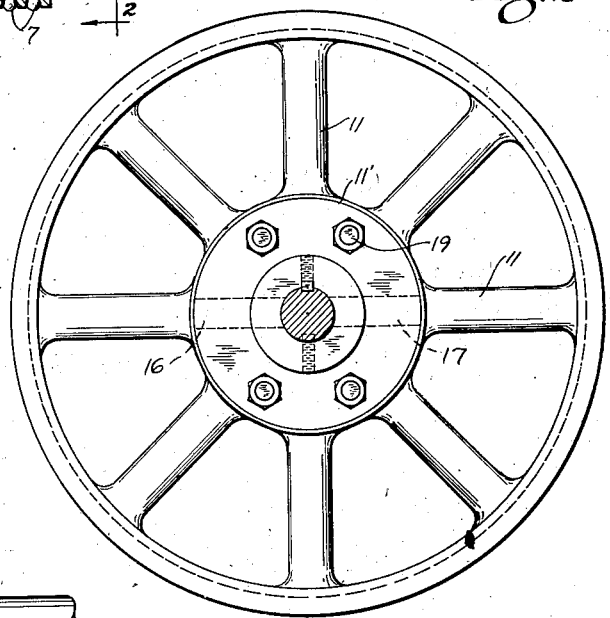
Fig. 2 is a view taken on the line 2—2 of Fig. 1 the pulley and coupling being shown in elevation and certain hidden parts shown by dotted lines.

Referring now to the figures of the drawing wherein like parts are designated by like reference characters, a pair of axial aligned spaced shafts 1 and 2 are provided each having relatively long keyways 3 and 4. The shafts may be rotatably journaled at their outer ends in bearings 21 and supported by the supports 22.

The shaft 1 is adapted to support a pulley 5. The pulley may be provided with a plurality of circumferential grooves 6 in the periphery or rim adapted to receive endless ropes 7. The hub of the pulley is telescoped on the shaft and comprises two parts, a sheave supporting portion 8 and a removable coupling portion 12, the sheave supporting portion may be keyed to the shaft 1 by a key 9 disposed in the keyway 3 of the shaft and a corresponding keyway in the hub. Longitudinal movement of the pulley on the shaft may be prevented by a set-screw 10 which is disposed in an aperture through the wall of the hub adapted to be screwed inward to impinge on the key in the keyway. The rim of the pulley is supported by the ends of a plurality of arms 11 which extend radially from a flange 11' of the hub.

The coupling portion 12 is disposed upon the shaft 2 in the same manner as the sheave support. A set screw 13 being provided is adapted to impinge on the key 14, to prevent relative longitudinal movement of the coupling and shaft and which when loosened permits the coupling to be moved longitudinally along the shaft.

The coupling has a peripheral flange 15 at the one end adjacent the pulley hub and a pair of tongues 16 and 17 extend diametrically across the face of the flange. The tongues are adapted to be disposed in engagement with a pair of grooves 18 disposed in the face formed by the flange 11' of the sheave supporting portion when the coupling is secured to said portion.

The coupling is secured to the flange 11' by a plurality of bolts 19 disposed through aligned apertures in the flange 11' and the flange 15 of the coupling.

Figure 3:
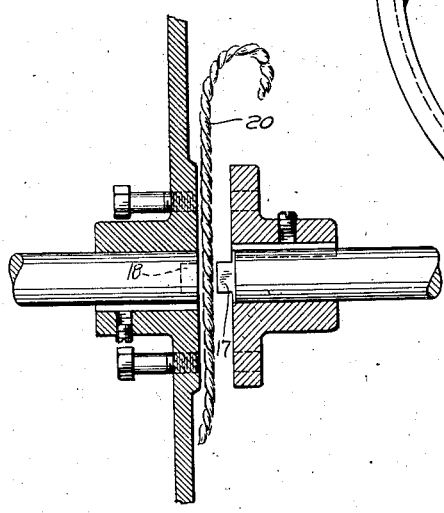
Fig. 3 is a fragmentary sectional view of the pulley hub and coupling, certain parts being shown in a different operative position.

When it is desired to dispose a driving means such as a rope or belt about the sheave or to remove the driving means, the bolts 19 are removed and the set screw 13 is loosened. The coupling 12 may then be slid along the shaft 2 to the right, as best shown in Figure 3, wherein the tongues are free from the recesses and access may be had to the space intermediate the ends of the shaft. The driving means which is indicated in the drawing as a rope 20 may then be readily passed between the ends of the shafts and disposed about the sheave. The coupling is then replaced and bolted securely to the pulley hub providing a relatively rigid mounting for the pulley upon the shafts and joining the shafts. Torsion from one shaft to the other is transmitted by the resistance to shearing of the tongues 16 and 17 in the grooves 18 and the bolts 19 disposed through the apertures in the coupling flange and hub and the keys 3 and 14 in their respective keyways in the shafts and hub.

With a pulley and coupling constructed as described, it may be readily seen that it is not necessary to remove the drive shaft, which is rotatably supported at its ends from its bearings when it is desired to renew the belting thereon, nor is it necessary to unlace the belting or splice the rope. It may be also seen that the pulley might be used without the coupling element as an ordinary pulley.

Although I have described my invention as particularly adapted for endless rope belts it is not my intention to thereby limit my invention, as the ordinary web belting or endless chain could be used in a similar manner.

Having thus described my invention I am aware that numerous and extensive departures may be made therefrom but without departing from the spirit of my invention.

I claim:

1. In combination, a pair of aligned shafts normally disposed a constant distance apart to form a gap between their respective ends, means connecting said shafts comprising a pulley having a divided hub, one portion of said hub being fixedly connected to one of said shafts, the other portion of said hub being connected to the other of said shafts, means for connecting said portions in interlocking engagement, said other portion of the hub being slidably mounted on its shaft and adapted in one position to close the gap between the shafts and in another position to open said gap whereby a driving element can be passed through the gap to supply or remove a drive to the pulley.

2. In combination, a pair of aligned shafts normally disposed a constant distance apart to form a gap between their respective ends, means connecting said shafts comprising a pulley having a divided hub, one portion of said hub being fixedly connected to one of said shafts, the other portion of said hub being connected to the other of said shafts, means for connecting said portions in interlocking engagement including a tongue on one of said portions and a cooperating groove on the other of said portions, said other portion of the hub being slidably mounted on its shaft and adapted in one position to close the gap between the shafts and in another position to open said gap whereby a driving element can be passed through the gap to supply or remove a drive to the pulley.

HARRY ALLEN DALLWIGK, Jr.